United States Patent
Horng et al.

(10) Patent No.: US 6,414,411 B1
(45) Date of Patent: Jul. 2, 2002

(54) SUPPORTING STRUCTURE FOR A ROTOR

(75) Inventors: Alex Horng; Ching-shen Hong, both of Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/848,316

(22) Filed: May 4, 2001

(51) Int. Cl.[7] .................................................. H02K 1/00
(52) U.S. Cl. ........................ 310/194; 310/90; 310/67 R
(58) Field of Search ........................ 310/194, 90, 90.5, 310/67 R, 43, 49 R, 91

(56) References Cited

U.S. PATENT DOCUMENTS

| | | | | |
|---|---|---|---|---|
| 3,513,339 A | * | 5/1970 | Harris et al. ................. | 310/90 |
| 3,772,544 A | * | 11/1973 | Wrobel ........................ | 310/90 |
| 4,130,770 A | * | 12/1978 | Wrobel ........................ | 310/67 R |
| 4,612,468 A | * | 9/1986 | Sturm et al. ................ | 310/67 R |
| 5,245,236 A | * | 9/1993 | Horng ........................ | 310/67 R |
| 5,258,672 A | * | 11/1993 | Wrobel ........................ | 310/42 |
| 5,610,462 A | * | 3/1997 | Takahashi .................... | 310/90 |

* cited by examiner

Primary Examiner—Nestor Ramirez
Assistant Examiner—Thanh Lam
(74) Attorney, Agent, or Firm—Bacon & Thomas, PLLC

(57) ABSTRACT

A combination of a rotor and a supporting structure for the rotor comprises an axle, a fixing member securely mounted in the axle tube, a supporting member securely mounted in a lower end of the axle tube, and a rotor having a shaft base and a shaft extending from the shaft base. The shaft includes an engaging groove. The shaft is extended through the fixing member with an end face of a distal end of the shaft rotatably resting on the supporting member and with the fixing member engaging with the engaging groove of the shaft. The shaft further includes an auxiliary supporting section, the auxiliary supporting section and an inner periphery of the axle tube having a minimal gap therebetween.

8 Claims, 4 Drawing Sheets

SUPPORTING STRUCTURE FOR A ROTOR

BACKGROUND OF THE INVENTION

1. Field of the Invention

The present invention relates to a supporting structure for a rotor, wherein the rotor shaft has a distal end face supported by a supporting portion of a supporting member, and wherein a permanent magnet and a balance plate attract each other such that the rotor shaft, except the distal end thereof, is not in frictional contact with the axle tube during rotation, thereby reducing the rotational noise and lengthening the longevity of the motor.

2. Description of the Related Art

FIG. 1 of the drawings illustrates a conventional motor structure that comprises a metal axle tube 90, a stator 91 mounted around the axle tube 90, a circuit board 92, and a balance plate 98. An oily bearing 93 is tightly engaged in the axle tube 90 for rotatably supporting a shaft 95 of a rotor 94. A distal end of the shaft 95 is rotatably supported by a support member 96. The rotor 94 rotates stably by means of mutual attraction between a permanent magnet 97 on the rotor 94 and the balance plate 98.

In such a conventional motor, the rotor 94 could not always rotate smoothly, as the lubricating oil in the oily bearing 93 leaks after the oily bearing 93 has been used for a period of time. In addition, the shaft 95 of the rotor 94 and the oily bearing 93 have a relatively large contact area therebetween. As a result, a relatively large friction exists and a larger noise is generated during rotation of the rotor 94. Furthermore, the cost for processing and manufacturing such a conventional motor is high.

SUMMARY OF THE INVENTION

It is the primary object of the present invention to provide a supporting structure for a rotor. The supporting structure can be manufactured conveniently. In addition, the shaft of the rotor and the supporting member for the shaft have a relatively smaller contact area therebetween.

It is another object of the present invention to provide a supporting structure for a rotor of a motor to thereby reduce the rotational noise and lengthen the longevity of the motor.

The present invention provides a combination of a rotor and a supporting structure for the rotor. The combination comprises an axle, a fixing member securely mounted in the axle tube, a supporting member securely mounted in the lower end of the axle tube, and a rotor having a shaft base and a shaft extending from the shaft base. The shaft includes an engaging groove. The shaft is extended through the fixing member with an end face of a distal end of the shaft rotatably resting on the supporting member and with the fixing member engaging with the engaging groove of the shaft. The shaft further includes an auxiliary supporting section, the auxiliary supporting section and an inner periphery of the axle tube having a minimal gap therebetween.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
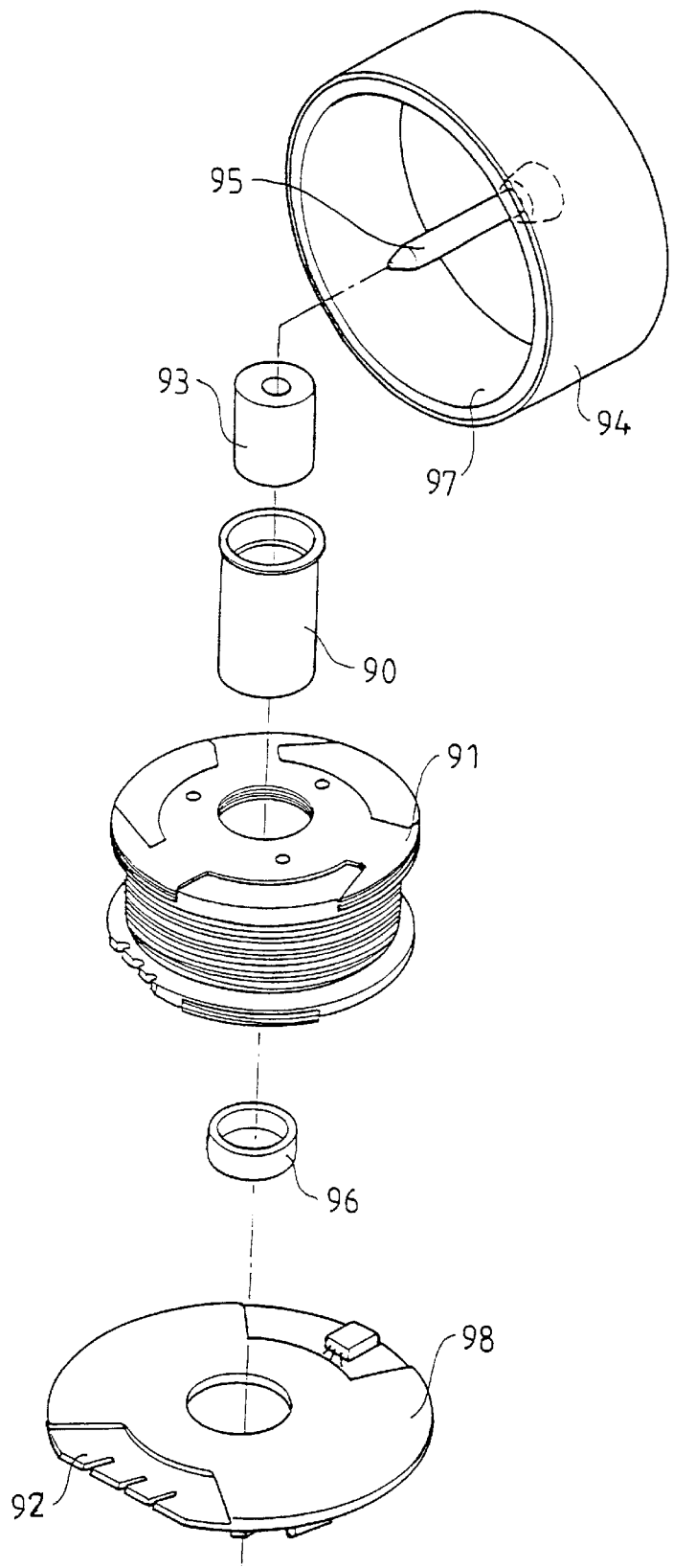
FIG. 1 is an exploded perspective view of a conventional motor structure.
Figure 2:
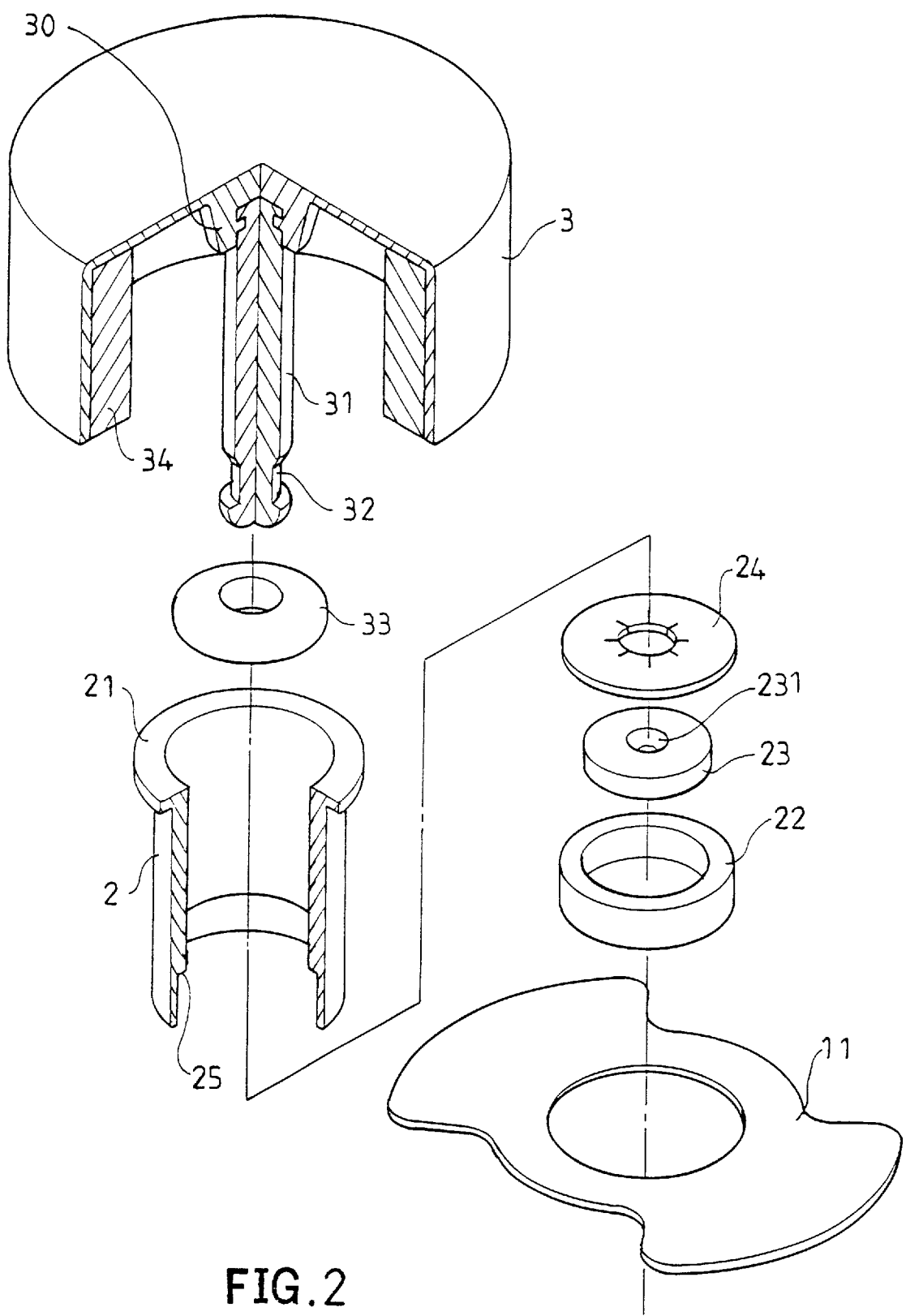
FIG. 2 is an exploded perspective view of a supporting structure for a rotor in accordance with the present invention.
Figure 3:
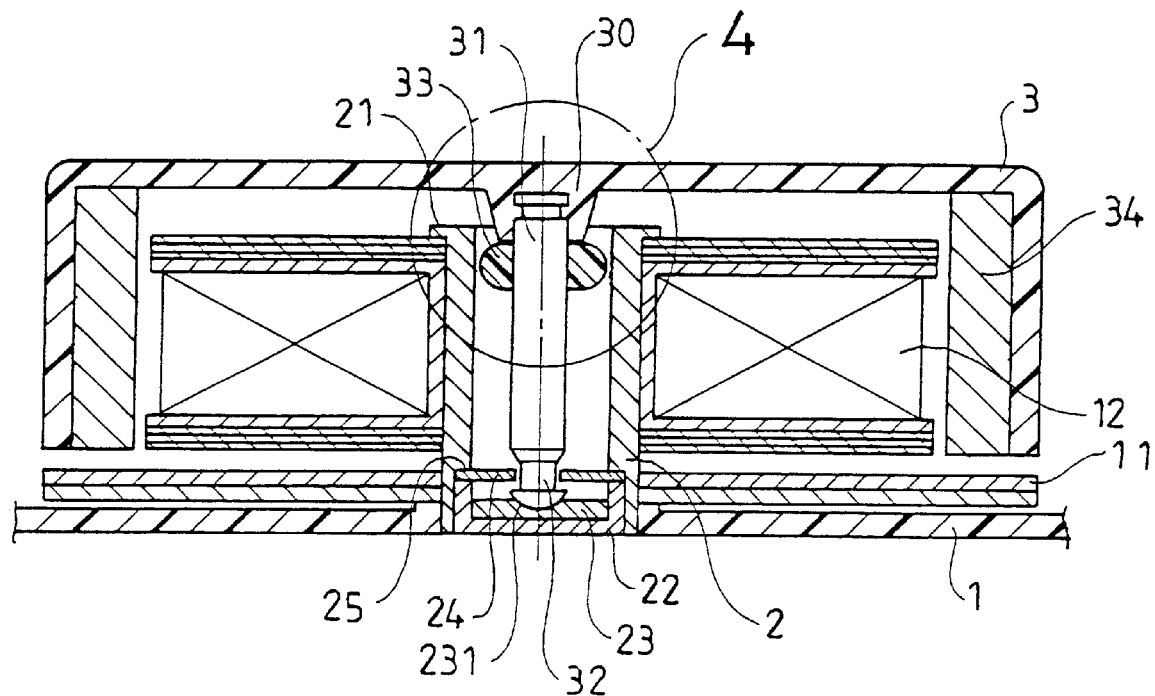
FIG. 3 is a sectional view of a motor having the supporting structure in FIG. 2.

Referring to FIGS. 2 and 3, a motor in accordance with the present invention generally includes a base 1 (FIG. 3), a metal axle tube 2, and a rotor 3. The base 1 may be a casing of any conventional motor or heat-dissipating fan. A balance plate 11 is mounted to the base 1 and made from magnetically conductive material for providing mutual attraction between the balance plate 11 and a permanent magnet 34 on the rotor 3, thereby providing stable rotation.

The metal axle tube 2 is made from magnetically conductive material and includes an end securely mounted to the base 1. A conventional stator bobbin 12 is mounted around the axle tube 2 and a flange 21 is formed on the other end of the axle tube 2 for preventing disengagement of the stator bobbin 12. A shaft 31 of the rotor 3 extends through the axle tube 2. A supporting member 22 is mounted in a lower end of the axle tube 2 for rotatably supporting an end face of a distal end of the shaft 31 of the rotor 3. In this embodiment, a supporting plate 23 made from abrasion-resistant material is mounted in the supporting member 22 and includes a recessed portion 231 on a top thereof. The recessed portion 231 may be concave for rotatably supporting the distal end face of the shaft 31 of the rotor 3. Thus, the rotating axis of the shaft 31 is located without the risk of shifting. Also mounted in the axle tube 2 is a fixing member 24 that can be a ring secured to an appropriate place by any suitable means. As illustrated in FIGS. 2 and 3, the axle tube 2 includes a stepped portion 25 in an inner periphery thereof, and the fixing member 24 is sandwiched between the stepped portion 25 of the axle tube 2 and the supporting member 22, best shown in FIG. 3. Thus, the fixing member 24 is fixed in place when the supporting member 22 is engaged with the lower end of the inner periphery of the axle tube 2.

The shaft 31 projects from a shaft base 30 of the rotor 3 and extends through the axle tube 2 and the fixing member 24 with the end face of the distal end of the shaft 31 rotatably resting on the supporting portion 231 of the support plate 23. The shaft 31 includes an annular engaging groove 32 defined in an outer periphery thereof for engaging with the fixing member 24. Thus, disengagement of the rotor 3 is prevented. An auxiliary supporting member 33 is mounted around the shaft 31 at a position adjacent to the upper end of the axle tube 2, thereby forming an auxiliary supporting section. The auxiliary supporting member 33 is a ring made from rubber or plastic material. The auxiliary supporting member 33 is securely mounted around the shaft 31 and includes an outer diameter slightly smaller than an inner diameter of the axle tube 2, thereby defining a minimal gap between the auxiliary supporting member 33 and the inner periphery of the axle tube 2. The permanent magnet on the rotor 3 and the balance plate 11 attract each other. In addition, the permanent magnet and the stator bobbin 12 have an induction therebetween.

Figure 4:
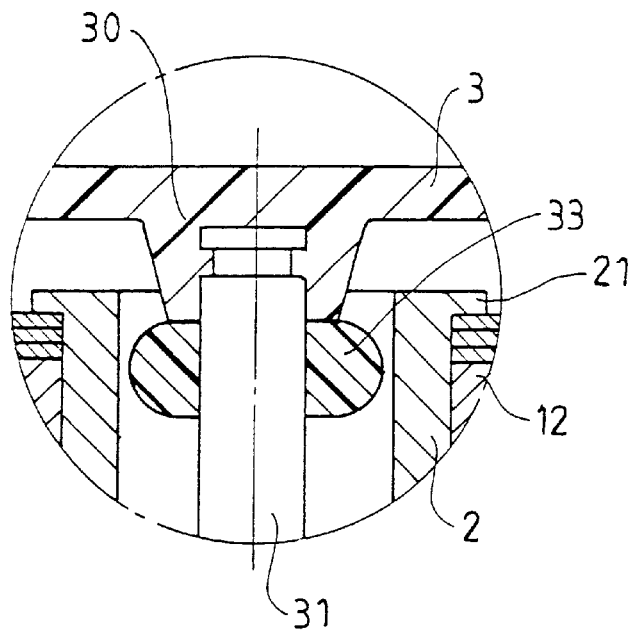
FIG. 4 is an enlarged view of a circle in FIG. 3.

FIGS. 3 and 4 illustrate assembly of the motor in accordance with the present invention. The distal end of the shaft 31 of the rotor 3 is extended through the axle tube 2 and the fixing member 24 until the distal end face of the shaft 31 rests on the supporting member 22 or the supporting portion 231 of the supporting plate 23. The fixing member 24 is engaged with the annular engaging groove 32 of the shaft 31 and sandwiched between the supporting member 22 and the stepped portion 25 of the axle tube 2. When the rotor 3 is not rotated, the shaft 31 is slightly declined such that the auxiliary supporting member 33 declines and abuts against the inner periphery of the axle tube 2 slightly. However, after the rotor 3 is driven to turn, the permanent magnet 34 and the balance plate 11 attract each other and the distal end face of the shaft 31 rotates stably on the supporting portion 231 of the supporting plate 23. As a result, the rotating axis of the rotor 3 is orthogonal to the base 1. Accordingly, the rotor 3 rotates stably while the auxiliary bearing portion 33 is not in contact with the inner periphery of the axle tube 2 during rotation of the rotor 3, best shown in FIG. 4.

Figure 5:
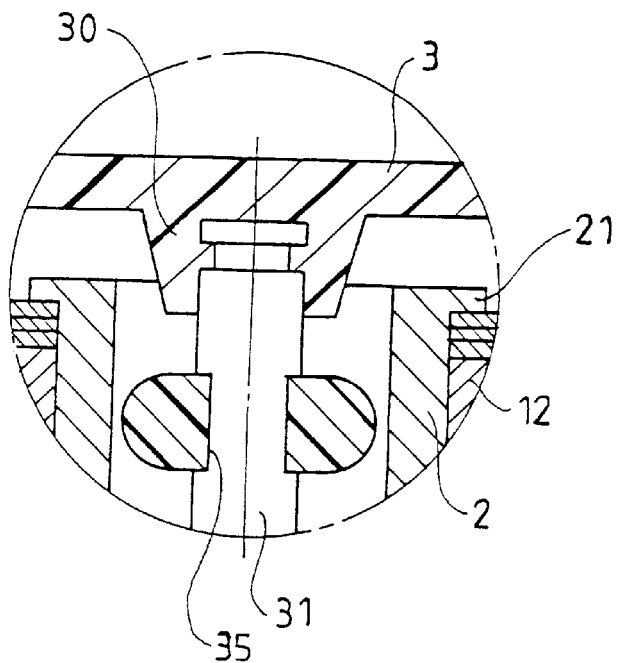
FIG. 5 is a view similar to FIG. 4, illustrating a modified embodiment of the invention.

FIG. 5 illustrates a modified embodiment of the present invention, wherein the shaft 31 includes an annular groove 35 for receiving an inner portion of the auxiliary supporting member 33, thereby positioning the auxiliary supporting member 33 in a more reliable manner.

Figure 6:
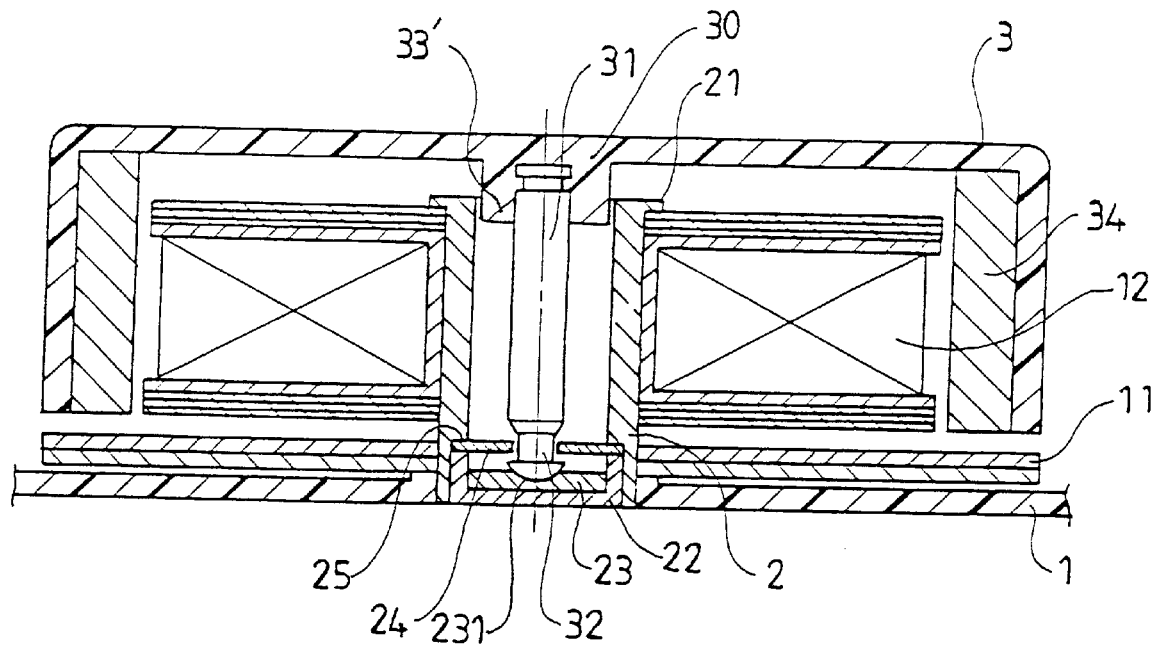
FIG. 6 is a sectional view similar to FIG. 3, illustrating another modified embodiment of the invention.

FIG. 6 illustrates another modified embodiment of the invention, wherein the shaft base 30 has an auxiliary supporting section 33' directly formed thereon. The auxiliary supporting section 33' functions in a manner identical to the auxiliary supporting member 33. The auxiliary supporting section 33 extends into the axle tube 2. In addition, the auxiliary supporting section 33' and the inner periphery of the axle tube 2 have a minimal gap therebetween. After the rotor 3 is driven to turn, the permanent magnet 34 and the balance plate 11 attract each other and the distal end face of the shaft 31 rotates stably on the supporting portion 231 of the supporting plate 23. As a result, the rotating axis of the rotor 3 is orthogonal to the base 1. Accordingly, the rotor 3 has rotates stably while the auxiliary bearing section 33' is not in contact with the inner periphery of the axle tube 2 during rotation of the rotor 3, According to the above description, it is appreciated that since the shaft 31 of the rotor 3 rests on the supporting member 22 or the supporting portion 231 of the support plate 23 merely at the distal end face of the shaft 31 and since the auxiliary supporting section 33 or 33' in addition to the feature that the inner periphery of the axle tube 2 have a minimal gap therebetween, the permanent magnet 34 and the balance plate 11 attract each other after the rotor 3 is driven to turn, and the distal end face of the shaft 31 rotates stably on the supporting portion 231 of the supporting plate 23. As a result, the rotating axis of the rotor 3 is orthogonal to the base 1. Thus, the rotor 3 rotates stably while the auxiliary supporting section 33 or 33' is not in contact with the inner periphery of the axle tube 2 during rotation of the rotor 3. Accordingly, the friction and noise as a result of rotation of the shaft 31 are reduced to the minimum. In addition, it is easy to process, manufacture, and assemble the rotor 3 and associated elements, thereby reducing the manufacture cost.

What is claimed is:

1. A combination of a rotor and a supporting structure for the rotor, the combination comprising:
   an axle tube including a lower end;
   a fixing member securely mounted in the axle tube;
   a supporting member securely mounted in the lower end of the axle tube; and
   a rotor having a shaft base and a shaft extending from the shaft base, the shaft including an engaging groove, the shaft being extended through the fixing member with an end face of a distal end of the shaft rotatably resting on the supporting member and with the fixing member engaging with the engaging groove of the shaft, the shaft further including an auxiliary supporting section, the auxiliary supporting section and an inner periphery of the axle tube having a minimal gap therebetween.

2. The combination as claimed in claim 1, wherein the inner periphery of the axle tube includes a stepped portion for engaging with the supporting member, the fixing member being sandwiched between the stepped portion of the axle tube and the supporting member.

3. The combination as claimed in claim 1, wherein the supporting member includes a supporting plate mounted therein, the end face of the distal end of the shaft being resting on the supporting member.

4. The combination as claimed in claim 3, wherein the supporting plate has a supporting portion on which the end face of the distal end of the shaft rests.

5. The combination as claimed in claim 1, wherein the auxiliary supporting section is a ring mounted around the shaft.

6. The combination as claimed in claim 5, wherein the shaft includes an annular groove for receiving a portion of the ring.

7. The combination as claimed in claim 1, wherein the auxiliary supporting section is directly formed on the shaft base of the rotor.

8. A combination of a rotor and a supporting structure for the rotor, the combination comprising:
   a base,
   a balance plate mounted on the base and made from magnetically conductive material;
   an axle tube including an end secured to the base, the end of the axle tube including an end face;
   a supporting member securely mounted in the end of the base, the end face of the axle tube being enclosed by the supporting member;
   a fixing member securely mounted in the axle tube and located adjacent to the supporting member, the fixing member including an opening; and
   a rotor having a shaft base and a shaft extending from the shaft base, the shaft including an engaging groove, the shaft being extended through the opening of the fixing member with an end face of a distal end of the shaft rotatably resting on the supporting member and with the fixing member engaging with the engaging groove of the shaft, the shaft further including an auxiliary supporting section, the auxiliary supporting section and an inner periphery of the axle tube having a minimal gap therebetween.

* * * * *